No. 885,504.

PATENTED APR. 21, 1908.

J. MUSZAR.
COFFEE MILL.
APPLICATION FILED AUG. 15, 1907.

Inventor
J. Muszar

Witnesses

By
Attorneys

UNITED STATES PATENT OFFICE.

JOHANN MUSZAR, OF CINCINNATI, OHIO.

COFFEE-MILL.

No. 885,504.  Specification of Letters Patent.  Patented April 21, 1908.

Application filed August 15, 1907. Serial No. 388,701.

*To all whom it may concern:*

Be it known that I, JOHANN MUSZAR, a subject of the King of Hungary, residing at Cincinnati, in the county of Hamilton and State of Ohio, have invented certain new and useful Improvements in Coffee-Mills, of which the following is a specification, reference being had therein to the accompanying drawings.

This invention relates to coffee mills, and the invention has for its object to provide a novel mill, wherein positive and reliable means is employed for grinding coffee or cereals, said mill being constructed whereby the crusher or agitator of the mill can be adjusted to grind fine or coarse as may be desired.

Briefly described, my mill consists of two shells detachably connected together, one of said shells being provided with a spider bearing for a shaft carrying a cone-shaped crusher or agitator. The other shell carries a detachable spool for regulating the crusher. The shaft is rotated by a crank that is also employed for adjusting the screw. The inner sides of the shell in which the crusher is located are slightly beveled and provided with inclined teeth to assist in crushing coffee or grain placed in the mill.

The detail construction entering into my invention will be presently described, and then specifically pointed out in the appended claims.

Figure 1:
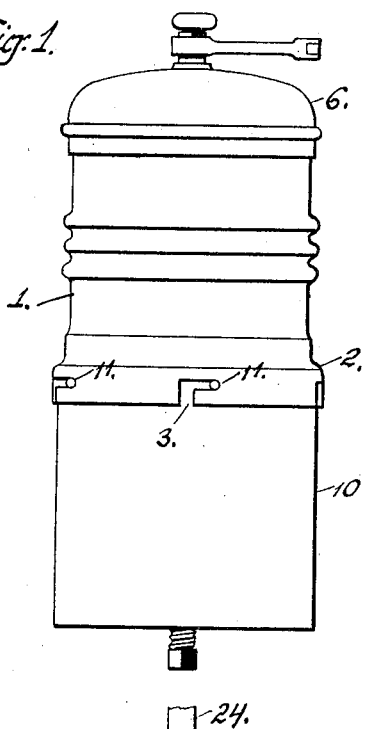
Figure 2:
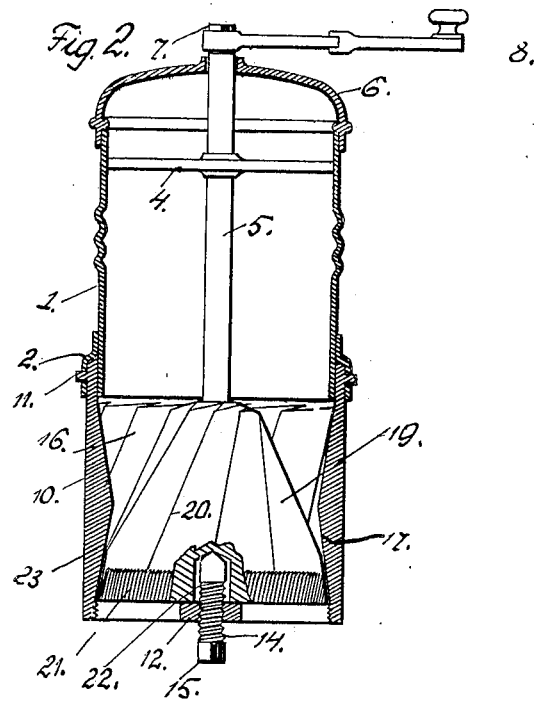
Figure 3:
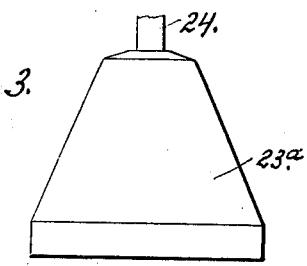
Figure 5:
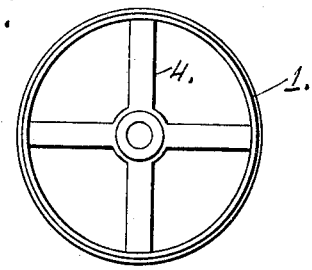
Figure 6:
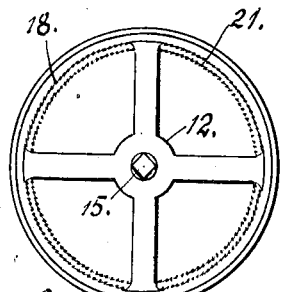
Figure 4:
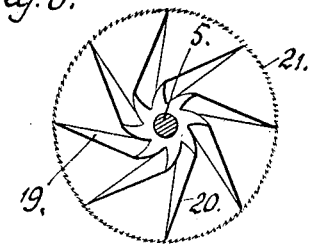
Figure 7:
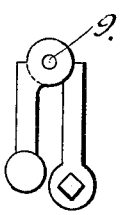

In the drawings, Figure 1 is an elevation of the mill, Fig. 2 is a vertical sectional view of the same, Fig. 3 is an elevation of the modified form of crusher, Fig. 4 is a bottom plan of the mill, Fig. 5 is a plan of the upper shell of the mill, Fig. 6 is a plan of the preferred form of crusher, and Fig. 7 is a plan of the crank used in connection with the mill.

To put my invention into practice, I construct my improved mill of an upper shell 1, the lower end of which is provided with a peripheral depending flange 2 having bayonet-shaped slots 3 formed therein. The upper end of the shell 1 is provided with a spider bearing 4 for a vertically disposed shaft 5, the upper end of said shaft extending through a cap 6 carried by the shell 1, and is formed with a rectangular shank 7 for a two part crank 8, the parts of said crank being pivotally connected together, as at 9.

Fitting between the peripheral flange 2 and the shell 1 is the upper end of a lower shell 10, said shell carrying radially disposed pins 11 to engage in the bayonet shaped slots 3 of the shell 1. The lower end of the shell 10 is provided with a detachable spider bearing 12 for an adjustable screw or bolt 14, having a rectangular head 15.

The inner sides of the shell 10 are formed with inclined teeth 16 and 17, gradually tapering towards the center of the shell. The teeth 17 terminate in fine teeth 18, which are used in connection with a crusher for finely grinding cereals.

The lower end of the shaft 5 carries a cone-shaped crusher 19 having inclined teeth 20 terminating in fine teeth 21, these fine teeth being vertically disposed with relation to the inner sides of the shell 10. The bottom of the crusher is recessed as at 22 to receive the upper end of the screw or bolt 14, whereby when said screw or bolt is adjusted, the crusher will be raised or lowered, increasing or decreasing the space 23 between the crusher and the shell, either to grind fine or coarse as may be desired.

The crank 8 can be detached from the upper end of the shaft 5, and used to adjust the screw or bolt 14, the eye of the crank fitting both the shank 7 of the shaft 5 and the head 15 of the adjusting screw 14. Coffee or grain can be placed in the mill by removing the cap 6 after the crank 8 has been removed.

The mill besides grinding coffee and grain can be used for crushing other material, and a smooth crusher 23$^a$ having the shaft 24 can be used in lieu of the crusher 19 and the shaft 5.

The mill is constructed of light and durable material and is made of a size for household use.

Having fully described my invention, what I claim and desire to secure by Letters Patent, is:—

In a coffee mill, two shells, an annular depending flange carried by the upper of said shells at the lower end thereof spaced from said shell and provided with bayonet slots, the upper end of the lower shell being received in the space between said upper shell and the flange and provided with pins to engage in said slots, the lower shell provided on its inner face with a grinding surface, a spider bearing carried by the upper shell near its upper end, a cap for said upper shell, a shaft journaled in said spider bearing and cap, means secured to the upper end of said shaft for operating the same, a bur carried on the lower end of said shaft, and an adjustable bearing within the lower end of the lower shell for supporting the bur and also for adjusting the position thereof within the lower shell.

In testimony whereof I affix my signature in the presence of two witnesses.

JOHANN MUSZAR.

Witnesses:
 STEFAN KOLLING,
 PETER SCHIRA.